US005192174A

United States Patent [19]

Hartmann

[11] Patent Number: 5,192,174

[45] Date of Patent: Mar. 9, 1993

[54] HYDRAULIC DRIVE FOR A TOOL HEAD

[76] Inventor: Hans Hartmann, Emser Strasse 14, D-7000 Stuttgart 50, Fed. Rep. of Germany

[21] Appl. No.: 777,226

[22] PCT Filed: May 4, 1990

[86] PCT No.: PCT/DE90/00319

§ 371 Date: Jan. 7, 1992

§ 102(e) Date: Jan. 7, 1992

[87] PCT Pub. No.: WO90/13747

PCT Pub. Date: Nov. 15, 1990

[30] Foreign Application Priority Data

May 7, 1989 [DE] Fed. Rep. of Germany ....... 3914860

[51] Int. Cl.[5] ........................... B23Q 5/36; F15B 9/00

[52] U.S. Cl. ...................................... 409/283; 82/133; 91/280; 92/114; 408/130

[58] Field of Search ............... 409/283, 285, 322, 329, 409/100, 186, 193; 408/130; 92/115, 114, 113, 13.1, 13.8; 82/133, 134; 91/380, 410

[56] References Cited

U.S. PATENT DOCUMENTS

| | | | |
|---|---|---|---|
| 3,080,852 | 3/1963 | Geyer | 92/13.1 |
| 4,116,112 | 9/1978 | Hampejs | 91/380 |
| 4,224,858 | 9/1980 | Tsuchiyama | 92/114 X |
| 4,412,465 | 11/1983 | Wright | 408/130 X |
| 4,527,244 | 7/1985 | Graham, Jr. | 409/100 X |
| 4,733,585 | 3/1988 | Link | 82/133 |

FOREIGN PATENT DOCUMENTS

| | | | |
|---|---|---|---|
| 2538547 | 11/1976 | Fed. Rep. of Germany | 92/113 |
| 149405 | 9/1983 | Japan | 92/114 |

*Primary Examiner*—William Briggs
*Attorney, Agent, or Firm*—Antonelli, Terry, Stout & Kraus

[57] ABSTRACT

A hydraulic drive (10) for the adjustment, feed and return movements of a tool head of a machine tool comprises a hydraulic motor (11) and an after-running adjustment valve (12). The reference value of the position is set and the actual value indicated by means of a threaded spindle (39) and spindle nut (37) in the form of a hollow shaft. One of these two elements can be driven by an electric motor (41) in order to set the reference value of the position. The other of these two elements can be driven in order to indicate the value of the actual position. A rotational and angular position indicator system (68, 74, 75 and 69, 77) produces an output which is a direct measure of the total number of revolutions executed by the preset reference value shaft and of the azimuthal position of the preset reference value shaft within each revolution. An electronic position sensor system (71, 78 and 71', 78'; 71'') produces an output which is a measure of the contouring error S. The actual position of the tool head or of the drive element of the hydraulic motor (16) is therefore phase-retarded in relation to its reference position by said contouring error.

12 Claims, 2 Drawing Sheets

HYDRAULIC DRIVE FOR A TOOL HEAD

FIELD OF THE INVENTION

The present invention relates to a hydraulic drive for adjustment, feeding and return movement of a toolhead of a machine tool.

BACKGROUND OF THE INVENTION

A hydraulic drive is proposed in, for example, DE 3,438,600 A1, wherein a hydraulic motor is provided which comprises a movable drive element fixedly connected to the tool, with the drive element being driven by alternative pressurization and pressure relief of drive pressure chambers along the lines of the tool movements. A follow-up control valve operating with electromechnically controllable reference position value setting for the movable drive element as well as with mechanical actual position value return indications thereof are also provided. For setting the reference position and value and return indication of actual position value, a threaded spindle is provided and a spindle nut, fashioned as a hollow shaft and meshing with the thread of the spindle are provided. As noted above, one of the spindle or nut of the spindle-nut system is driven by an electric motor so as to set to the reference position value and the other of the spindle or nut is driven along the lines of the return indication of the actual position in such a manner that, in case of equilibrium of the rate of change of the reference position value setting and the actual position value return indication, the spindle and the nut revolve at the same rotational speed and do not execute any axial relative movement with respect to each other. Within the scope of the follow-up control valve, a valve operating member is provided which partakes, when the spindle and the nut rotate at a different rotational speed, in relative movements of the nut with respect to the spindle and thereby drives the valve along the lines of increasing the throughflow cross-sections of supply paths through which the pressure medium flows for obtaining the respectively desired direction of movement, if the rate of change of the actual position is less than the change of the reference position value setting, and maintains these cross-sections constant if, and as long as, these rates of change are the same. The signals required for the motion control of the electric motor are produced by an electronic control unit with an interface for NC or CNC control.

In order to be able to determine whether and/or when the tool, driven by the drive mechanism has reached a specific position, either for determining whether the tool has executed its working stroke at all or for being able to accurately recognize the end point of its working stroke, for example, when the result of the operation is dependent upon actually reaching a definite end position, as in case of a press or embossing machine, a monitoring device is provided wherein the distance of the control valve operating member from its basic position is monitored and, once this distance falls below a predeterminable defined minimum value equivalent to the situation where the tool approaches dead center, a position-characteristic monitoring signal of a proximity switch is triggered. Thereby, a determination of the programmed dead center position of the tool is obtained which is sufficiently exact for many usage applications, with this determination indicating that the tool has executed its working stroke. It is merely necessary to effect suitable programming of the reference value setting device for adjusting the device to a specific stroke length of the tool and a specific material thickness of the workpiece and/or shaping depth thereof. The detection of the dead center position takes place with the aid of a proximity switch which responds when a rotary vane, driven via a transmission gear by the valve operating member, enters into a defined, preset position corresponding to the central position of the valve operating member assumed by the latter once equality has been reached of the reference position and the actual position. This is equivalent to reaching the dead center position of the tool.

In the conventional device, there is also a determination when the follow-up control valve is fully driven, that is, when the lag error $\Delta S$ of the control circuit has become very large. This can be considered as evidence that a collision has occurred between the drive element and an obstacle, and, in such case, the drive mechanism is turned off. In this arrangement, the direction of movement of the drive element is also taken into account. In other words, it can be recognized by signal combinations generated by the monitoring device whether a collision has taken place in the forward or rearward direction.

Although it is definitely possible in the conventional drive mechanism to effect adaptation of its monitoring device to various usage purposes in that this device can be adjusted so as to vary threshold values of the lag error $\Delta S$, it is not possible to detect the lag error with respect to its amount as long as this error lies below the aforementioned threshold value. Consequently, there is a drawback insofar as a change in the lag error, for example, along the lines of an increase of the same, occurring during the operation of the machine equipped with the drive mechanism, cannot be detected.

SUMMARY OF THE INVENTION

An object of the present invention resides in the providing an improved drive of the type discussed hereinabove to the extent that a continuous and uninterrupted detection of the lag error $\Delta S$ is possible.

In accordance with the advantageous features of the present invention, a hydraulic drive for the adjustment and feed as well as return movements of a tool head of a machine tool is provided wherein a rotational and angular position of a pickup system is provided which produces an output constituting a direct measure for the number of revolutions executed in total by the reference value setting shaft, as well as for the azimuthal position of the reference value setting shaft within each revolution, and an electronic displacement pickup system is provided, the output of which is a direct measure for axial deflections of the reference value setting shaft with regard to the reset position thereof, based on the rest position of the operating member of the follow-up control valve and, consequently, a measure for the lag error $\Delta S$ by which the actual position of the toolhead and/or the drive element of the hydraulic motor trails with respect to its reference position.

By virtue of the features of the present invention, the monitoring device comprises a rotational position pickup producing, for example, in digital format, an output constituting a direct measure for the revolutions performed in total by the reference value setting shaft as well as its azimuthal position with each revolution. Furthermore, an electronic displacement pickup is provided, the output of which constitutes a direct measure for the axial deflection of the reference value setting shaft with respect to the neutral position thereof and, respectively, the neutral position of the value operating member and, consequently, a measure for the lag error ΔS by which the actual position of the tool or the drive element of the hydraulic motor trails with respect to its reference position.

By virtue of the fact that the position of the reference value setting shaft is monitored, along the lines of a measurement, the position reference value governing, at that instant, for the operating condition of the drive mechanism is exactly known and it is not burdened by inaccuracies that can occur, for example, with a pulse control of a stepping motor provided for driving the reference value setting shaft due to the fact that the stepping motor overlooks, so to speak, an activating pulse when the activating pulse repetition frequency happens to be too high.

Due to the permanent measurement of the deflection of the valve operating member of the follow-up control valve from its rest position, i.e. the measurement of the lag error of the control device that can be converted into units of the position of the tool driven by the drive mechanism, its actual position is likewise known at the same time so that the extent to which the machining process has progressed can be accurately recognized in every phase of a machining operation performed with the use of the drive mechanism according to this invention.

A logical and simple utilization of this realization can consist, for example, in evaluating, during a plurality of identical machining operations that are periodically repeated, the size of the lag error ΔS at a specific reference position of the tool driven by the drive mechanism. If it is found herein that the lag error ΔS, based on this specific reference position of the tool, increases continuously over several operating steps, then this is evidence of the fact that the tool becomes impaired, for example, blunt, and thus must soon be replaced.

The drive mechanism of the present invention offers the possibility of recognizing a threatening malfunction of the machine equipped with this mechanism in total and thus, of course, also the possibility of timely avoiding this malfunction that could result in damage to the machine.

On the other hand, in the drive mechanism of the present invention, also those phases of machining can be recognized wherein, although the lag error ΔS rises, this increase is always the same during periodically repeated machining processes. This can be evaluated as evidence that the machining operation is not optically programmed as seen from the position reference value setting control. In other words, the setting of the position reference value takes place to quickly for the machining phase under consideration.

In accordance with further advantageous features of the present invention, an electronic control and processing unit is provided which brings about activation of the electric motor along the lines of setting the reference position value, to which control and processing unit there can be fed as the input the output of the rotational and angular position pickup system as well as the displacement pickup system. The electronic control and processing unit produces, from the processing thereof, correction signals for an at least partial lag error compensation and/or for maintaining the lag error ΔS constant and/or for cutting off the drive when the lag error ΔS exceeds an adjustably preset threshold value.

By virtue of the provision of an electronic control and processing unit, from the viewpoint of an early recognition of tool wear as well as from the viewpoint of optimum control, that is, programming of the machining operation, the control and processing unit can produce, from processing the output values from the rotational position pickup and from the displacement pickup, as necessary, control signals for functions such as, for example, maintaining the lag error constant and/or reducing the lag error by changing the circuit amplification of the control circuit and/or inactivating the drive mechanism once the lag error ΔS exceeds a tool-specific value that is preset in an adjustable fashion.

The control unit of the present invention makes it possible to utilize the drive mechanism, for example, along the lines of the best compromise possible between desirably high dynamics and a yet gentle operation.

According to the present invention, the rotational and angular position measuring system includes a rotating pickup element with a contour of which, as viewed in a peripheral direction, is of a periodically wavy or periodically toothed shape, the voltage output signal characteristic for the angular position of the reference value setting shaft is produced by the passage of the rotating pickup element past at least one sensor element. The pickup element is disposed in a coaxial relationship with the central axis of the reference value setting shaft and the actual value return indication spindle is nonrotationally connected with the reference value setting shaft, while the sensor element is arranged fixedly at the machine and/or a further pickup element is nonrotationally connected with the reference value setting shaft, the circumference of which includes a radially projection or radial recess. The passage of the projection or recess past a further electronic sensor element fixedly arranged at the machine makes it possible to trigger reference signals for the number of completely executed revolutions by the reference value setting shaft.

By virtue of the last-mentioned features of the present invention, for the rotational position pickup intended for monitoring the setting of the position reference value and the arrangement of its rotating pickup elements on the reference value setting shaft of the follow-up control valve of the drive mechanism, a very accurate detection of the respectively governing position reference values of, in the final analysis, the tool can be realized since there are no transmission or translating elements, which can be burdened by slippage or play, connected between the position reference value setting shaft and the rotational position pickup.

The above comments also apply with regard to the accuracy of the lag error measurement when, according to the invention, the displacement pickup system or displacement measuring system detects axial deflections of the reference position value setting shaft of the follow-up control valve and includes a pickup element nonrotationally and nondisplaceably connected with the reference value setting shaft. The axial deflections of the pickup element, with respect to at least one non-contacting responding electronic sensor element arranged fixedly at the machine, changes the output signal of the sensor element to the extent reflecting characteristic deflections. The rotor of the electric motor provided for setting of the reference position value is, advantageously, nonrotationally and nondisplaceably connected with the reference value setting shaft and is arranged to be shiftable with the shaft axially relative to the stator of the motor fixedly mounted to the housing.

In order to provide a drive mechanism with small axial dimensions, in accordance with still further features of the present invention, the actual position return indication spindle is surrounded, with a section of its length corresponding at least to the displacement path of the drive element of the hydraulic motor, by the reference value setting shaft fashioned as a hollow shaft.

In accordance with further features of the present invention, the electric motor, provided for controlling the setting of the reference position value, is arranged in a leakage oil chamber of the drive. By virtue of the arrangement of the control motor for the follow-up control valve in the leakage oil chamber completely filled with hydraulic oil during operation of the drive mechanism, the operating medium of the drive mechanism can be utilized, in a simple manner, for cooling the control motor which latter can thereby be activated with greater electric power which, in turn, benefits the dynamics of the entire drive mechanism.

In order to provide a considerable structural simplification of the drive mechanism by, for example, reducing the number of gaskets and sealing surfaces required for such gaskets that must be machined with great accuracy, according to the present invention, the rotational and angular position measuring system and/or the lag error measuring system is and/or are arranged in the leakage oil chamber of the drive. Additionally, the rotational position and lag error measuring system is within the oil, that is, in a housing space of the drive mechanism which is in communication with the space housing the control motor. In such a case, it is then merely necessary to seal the housing portion containing the measuring systems, the motor, and the leakage oil chamber of the follow-up control valve with respect to the outside, while the corresponding chambers within the housing need only be sealed off with respect to one another.

It is also possible in accordance with the present invention to provide a power output stage, intended for the direct activation of the control motor, of the electronic control device provided for the operational control of the drive mechanism in a pressureless leakage oil chamber of the device thereby making it possible to cool this stage. In this connection, it is, of course, understood that the electrical supply and control lines, as well as the signal cables, via which the sensor elements of the rotational position pickup and of the displacement pickup are connected to the electronic control unit, must be extended from the housing of the drive unit in an insulated and leakproof fashion, but this can be accomplished without any problems from a technical point of view.

In accordance with the present invention, the rotational and angular position measuring system advantageously comprises, as a mechanical pickup element, a toothed rim with one hundred teeth distributed equidistantly over a circumference of the rim and extending in an axial direction. Two electronic sensor elements are provided with the azimuthal distance which is an odd number multiple of the one-fourth of the angular distance of the neighboring teeth of the toothed rim. The two electronic sensor elements are fashioned as field plate sensors of a conventional type of construction. By virtue of these features of the rotational position pickup provided for monitoring the setting of the position reference value, it is possible to obtain an angular resolution of the rotational position of $3.6 \cdot 10^{-20}$.

According to the present invention, mechanical pickup element includes at least one ramp surface extending obliquely to the central longitudinal axis, the variation of the distance of the ramp surface from the respective sensor element, linked with an axial shift of the pickup element, yields a shift-proportional change of the output signal of the respective sensor element. Furthermore, the mechanical pickup element of the lag error measuring system, as viewed over its length, may have a periodically varying diameter, with two electronic sensor elements being provided and located an axial distance $\Delta L$ from each other which is an odd number multiple of $l/4$ wherein $l$ represents the length of periodicity of the diameter variation of the pickup element. The displacement pickup makes it possible to detect the lag error $\Delta S$ of the drive mechanism, wherein the lag error $\Delta S$ can be measured to an accuracy of at least 1/100 of its maximum amount.

In order to eliminate an association of the neutral position of the valve operating member of the follow-up control valve with a specific output signal level of the displacement pickup and avoid time-consuming adjusting and calibrating operations, according to the present invention, the electronic control unit comprises a correction or evaluating circuit by means of which the output of the rotational and angular position measuring system, produced in the basic position of the follow-up control valve and/or of the lag error measuring system can be taken into account as reference values for the rotational and angular position measurement and, respectively, for the lag error measurement.

BRIEF DESCRIPTION OF THE DRAWINGS

Further details and features of the present invention can be seen from the following description of a specific embodiment with reference to the accompanying drawings wherein.

DETAILED DESCRIPTION

Figure 1:
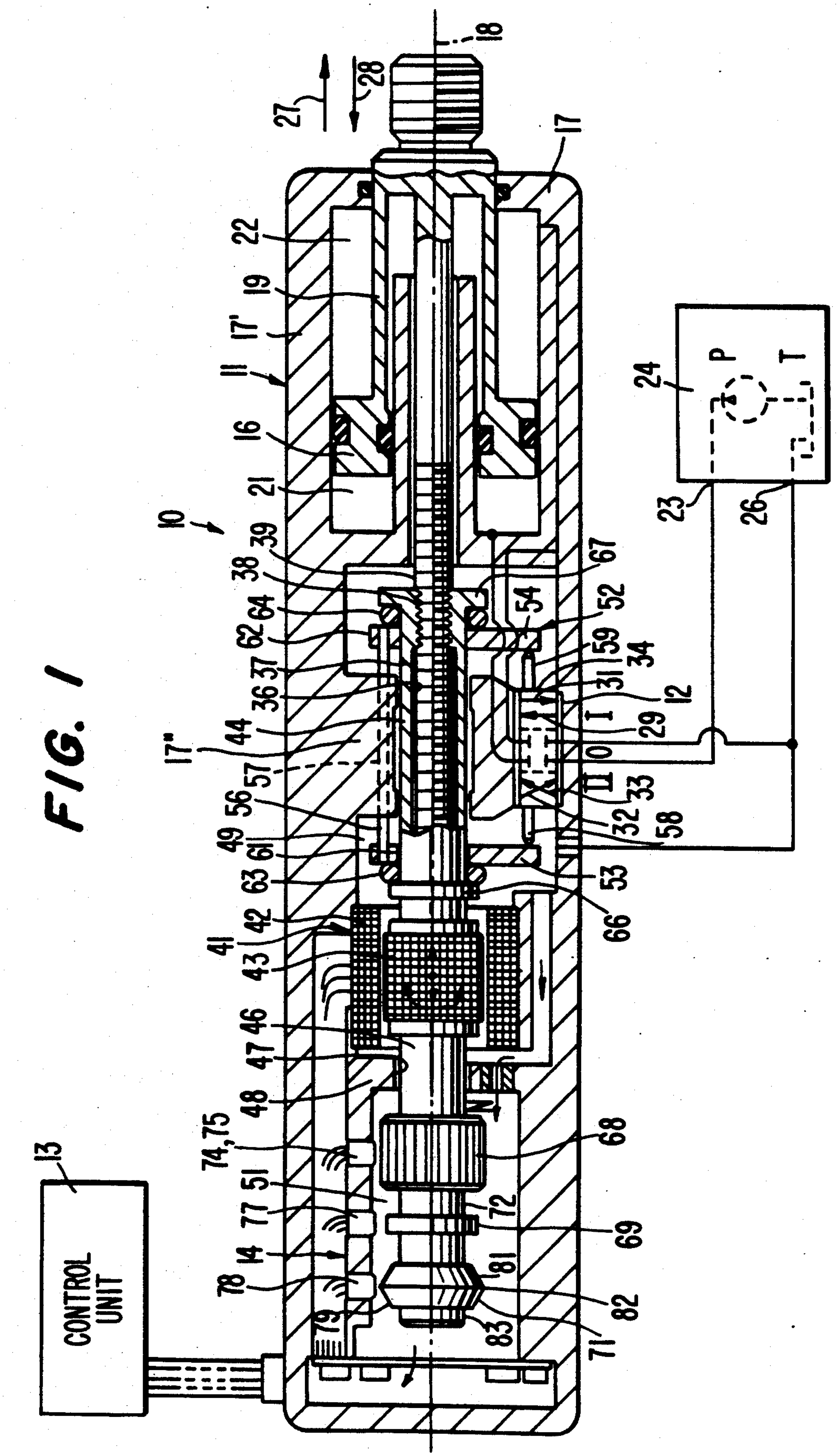
FIG. 1 is a partially schematic axial cross-sectional view of a hydraulic drive constructed in accordance with the present invention including a measuring system for the reference value of the piston position and for the lag error of the control.

Referring now to the drawings wherein like reference numerals are used throughout the various views to designate like parts and, more particularly, to FIG. 1, according to this figure, in accordance with the present invention, a hydraulic drive mechanism generally designated by the reference numeral 10 includes a hydraulic motor generally designated by the reference numeral 11, a follow-up control valve generally designated by the reference numeral 12 operating with an electrically controlled setting of the reference value of the position of a tool (not shown) brought into its operating positions by the hydraulic motor 11 and with a mechanical position actual value return indication, an electronic control unit 13 for the position reference value setting control, and a measuring system generally designated by the reference numeral 14 by which the inputted position reference value of the tool and/or drive piston 16 can be measured and the lag error ΔS can be detected by which the tool or drive piston 16 tails the activated position reference value.

In the drive unit 10, the hydraulic motor 11, the follow-up control valve 12, and the measuring system 14 are designed as a compact structural unit accommodated in a housing 17 common to all of these elements, wherein the follow-up control valve 12, as viewed along the central axis 18 of the structural unit 11, 12, 14, is arranged between the hydraulic motor and the measuring system 14.

In the illustrated embodiment, the hydraulic motor 11 is fashioned as a linear hydraulic cylinder, with a piston 16 of this hydraulic cylinder, firmly connected to a piston rod 19, defining within a section of a housing 17 forming the casing 17' of the hydraulic cylinder 11 to drive pressure chambers 21, 22 of the hydraulic cylinder 11, which chambers 21, 22 are movable with respect to each other in a pressure-type fashion. The drive piston 16 can be driven in the advance or return directions of movement represented by the arrows 27, 28 by the alternative connection of these drive pressure chambers 21, 22, controlled by the follow-up control valve 12, to the high pressure (P) output 23 of a pressure supply system 24 and, respectively, to its tank (T) connection 26.

The follow-up control valve 12 is, in regard to its function, a 4/3-way valve, with the neutral basic position 0 being a blocking position wherein both drive pressure chambers 21, 22 of the hydraulic motor 11 are blocked against the output 23 as well as against the connection 26 of the pressure supply system 24.

In the functional position I of the follow-up control valve 12 associated with the feeding operation of the drive mechanism 10, one of the drive pressure chambers 21 of the hydraulic cylinder on the left-hand side in the drawing, is connected by way of a flow path 29 of the follow-up control valve 12 to the output 23 of the pressure supply system 24; whereas, the other drive pressure chamber 22 is relieved of pressure through a flow path 31 to the tank 26 of the pressure supply system 24. In the functional position I of the follow-up control valve 12, the piston 16 of the hydraulic cylinder 11 moves in the direction of the arrow 27 toward the right in FIG. 1.

In the functional position II of the follow-up control valve 12 associated with the return operation, the drive pressure chamber 21 in the left of FIG. 1 is connected through a flow path 32 of the follow-up control valve 1 to the pressureless tank connection 26 of the pressure supply system 24; whereas, the other drive pressure chamber 22 of the hydraulic cylinder 11 is connected, by way of the second flow path 33 effective in the functional position II of the follow-up control valve 12, to the output 23 of the pressure supply system 24. In the functional position II of the follow-up control valve 12, the drive piston 16 of the hydraulic motor 11 moves in the direction of the arrow 28 toward the left in FIG. 1.

The follow-up control valve 12 which, for purposes of explanation, is a slide valve, and the piston 34 fashioned, for example, as a 4/3-way valve, is fashioned as a proportional valve which vacates, as viewed from its blocking basic position 0, with increasing shift of its valve piston 34 toward the left in FIG. 1, i.e. along the lines of acting on the hydraulic motor 11 in the feeding direction 27, increasingly larger cross-sections of the flow paths 29 and 31 and, with increasing shift of its valve position 34 toward the right in FIG. 1, along the lines of acting on the hydraulic motor in the return direction 28, increasingly larger cross-sections of the flow paths 32 and 33, with the valve piston 34 moving, in each case, in the direction oppositely to the direction of movement of the drive piston 16.

In order to be able to operate the follow-up control valve 12, as described above, along the lines of controlling the movement of the piston 16 of the hydraulic motor 11 and the tool driven thereby as necessary into its various functional positions 0 and I or II, the functional elements described below are necessary.

A hollow shaft 37 is rotatably and axially displaceably supported in a central bore 36, coaxial to the longitudinal axis 18 of the drive mechanism 10, of a block-shaped central section 17'' of the housing 17 forming the housing of the follow-up control valve 12. The hollow shaft 37 is provided with an internal thread 38 on its end section facing the hydraulic motor 11, by way of which it is in meshing engagement with a central, elongated threaded spindle 39 fixedly connected with the drive piston 16 of the hydraulic motor 11. The hollow shaft 37, to preset the position reference value of the drive piston 16 of the hydraulic motor 11, driveable by an electric motor generally designated by the reference numeral 41, with the current supply for the motor 41 being controlled along the lines of position reference value presetting by electrical output signals of the electronic control unit 13.

The electric motor 41, in the illustrated embodiment, has a stator 42 arranged fixedly at the housing and a rotor 43 which can be axially shifted. The rotor shaft of the rotor 43 includes a section of the hollow shaft 37 which, for this purpose, is nonrotatably and nondisplaceably connected to the rotor 43. The rotor 43 is rotatably supported, via the section 44 of the hollow shaft 37 axially penetrated by the threaded spindle 39, on the block-shaped central section 17'' of the housing 17, and with a further extended section 46 of the hollow shaft 37 carrying the rotor 43, in a central bore 47 of a partition 48 of the housing 17. The partition 48 separates the space 49, occupied essentially by the motor 41 and the follow-up control valve 12, from the housing space 51 provided for the accommodation of the measuring system 14. However, the spaces 49, 51 are not sealed off from each other in a pressure-type fashion but rather form, in total, the leakage oil chamber of the 10 drive mechanism 10. In the central portion 17'' of the housing 17 of the drive mechanism 10, housing the follow-up control valve 12, a valve operating member generally designated by the reference numeral 52 is supported so as to be axially but nonrotatably displaceable. The valve operating member 52 is yoke-shaped in its basic form and includes two yoke legs 53, 54 extending in parallel to each other. The legs 53, 54 are fixedly joined by a guide rod 56 extending in parallel to the central longitudinal axis 18 of the drive mechanism 10 and passing through a radially lateral guide bore 57 of the blocked-shaped, central housing section 17''. By way of respectively one operating pin 58, 59, respectively, the legs 53, 54 engage axially at the mutually opposite sides of the valve piston 34, wherein this support of the yoke legs 53, 54 on the operating pins 58, 59 and, respectively, on the valve piston 34 is flush in a shape-mating fashion.

The two yoke legs 53, 54 have mutually aligned bores 61, 62 coaxial to the central longitudinal axis of the drive mechanism 10. The diameter of the bores 61, 62 is slightly larger than an outer diameter of the hollow shaft 37 so that the latter can pass through the bores 61, 62 of the yoke legs 53, 54 of the valve operating member 52 with a play sufficient for a smooth revolution.

The valve operating member 52 is axially supported without axial play between radial entraining flanges 66, 67 of the hollow shaft 37 by ball bearings 63, 64 providing an easy rotatability of the hollow shaft 37 relative to the valve operating member 52.

For the purpose of explaining the function of the components of the drive mechanism 10, it is assumed that the hydraulic motor is to execute a feeding motion in the direction of the arrow 27, starting from a rest position wherein the follow-up control valve 12 occupies its blocking position 0, for example, the illustrated rest position.

For this purpose, the electric drive motor is drivable in opposite directions of rotation, with the rotor 43 and hollow shaft, due to the threaded engagement with the threaded spindle 39 initially remaining at rest. The electric drive motor is driven by output signals of the electronic control unit 13 with such control unit 13 controlling the direction of rotation of the electric drive motor 41. The electric drive motor 41 experiences an axial displacement in the direction of the arrow 28 in opposition to the feeding direction of the arrow 27. This direction is also transmitted, via the valve operating member 52, likewise executing this introductory axial displacement of the hollow shaft 37, to the valve piston 34 of the follow-up control valve 12, the latter thereby entering its functional position I associated with the feeding operation. By virtue of the resultant increasing pressurization of the drive chamber 21 of the hydraulic motor 11, with simultaneous pressure relief of its outer drive pressure chamber 22, the piston 16 of the hydraulic motor il now experiences a displacement in the feeding direction designated by the arrow 27. This displacement, due to the shaped-mating meshing between the threaded spindle 39 and the internal thread 38 of the hollow shaft 37, is also transmitted to the latter and thus to the valve piston 34 which thereby is again displaced in the direction toward its basic position 0, i.e. along the lines of reducing the effective cross-sections of the flow paths 29, 31 of the follow-up control valve 12. After a response build-up of the control, requiring merely a brief time span, a stationary state is reached wherein the hollow shaft 37 is driven at such a number of revolutions that the axial shift of these two elements 37, 39 with respect to each other, corresponding to the rotational relative movement of the hollow shaft 37 with respect to the threaded spindle 39, is equal to the advancing speed of the piston 16. In this stationary operating condition, i.e. corresponding to a constant advancement speed of the piston 16 of the drive mechanism 10, which corresponds to equality of the actual value of the feeding speed of the drive piston 16 and of the reference value of the feeding speed, the valve operating member 52 is at rest, and the follow-up control valve 12 is opened in its functional position I to such an extent that the oil volume stream dV/dt coupled into the pressurized drive pressure chamber 21 of the hydraulic cylinder or withdrawn from its pressure-relieved pressure chamber 22 has exactly the value F * ds/dt, wherein F is the value of the pressurized surface of the drive piston 16 and ds/dt is the feeding speed in the direction of the arrow 27.

The mode of operation of the drive mechanism 10 in the return operation of the hydraulic motor 11, when the electric motor 41 is activated in the opposite direction of rotation is analogous wherein merely the effective cross-sectional area of the piston 16, in the illustrated embodiment is smaller.

However, in the stationary operating condition of the drive mechanism 10, corresponding to equality of the actual value and reference value of the speed of motion of the piston 16, there exists a difference between the respective instantaneous governing reference value of the position of the drive piston 16 and its actual value. This difference is equal to the deflection stroke of the follow-up control valve piston 34 from its basic position 0, required for maintaining the stationary condition, and corresponds to the lag error ΔS of the control by which the actual position value of the drive piston 16 and/or the tool trails the reference value.

Figure 2A:
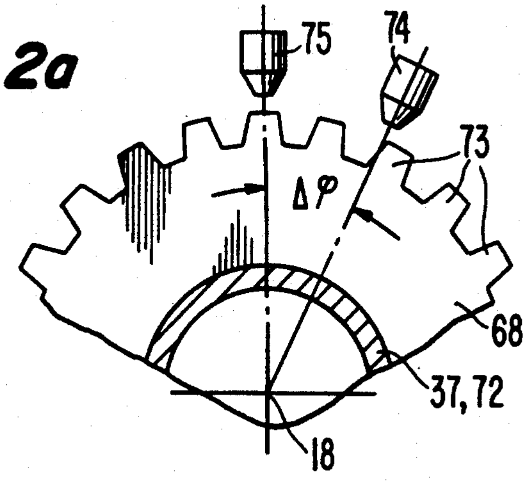
FIG. 2*a* is a schematic view, on an enlarged scale, of a rotational position pickup unit of the measuring system of FIG. 1.
Figure 2B:
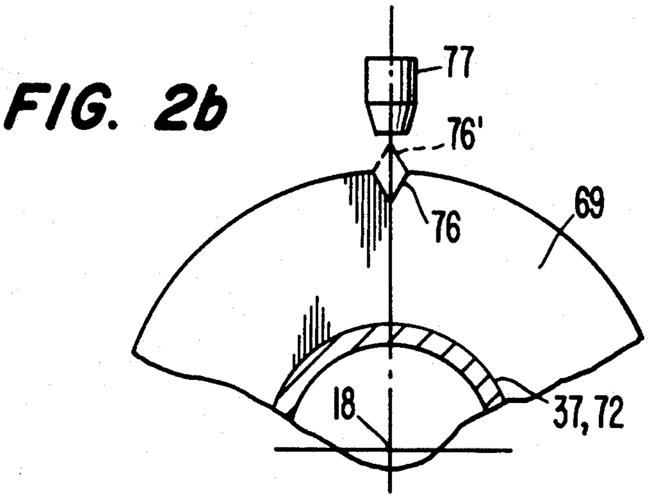
FIG. 2*b* is a schematic view, on an enlarged scale, of a reference signal pickup of the measuring system of FIG. 1.
Figure 2C:
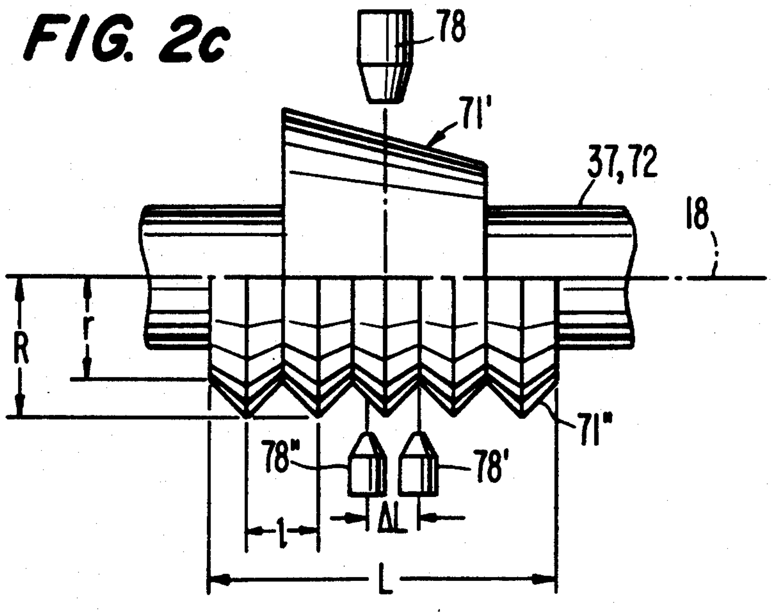
FIG. 2*c* is a schematic view depicting a lag error pickup of the measuring system according to FIG. 1.

The measuring system 14, as shown in FIGS. 2*a*, 2*b*, 2*c*, comprises, in total, three pickup elements 68, 69 and 71 which, in their basic form, are essentially rotationally symmetrical. The pickup elements 68, 69, 71 are arranged, with the pattern that can be seen from FIG. 1, at mutual axial spacings nonrotationally and nondisplaceably on the end section 72 of the hollow shaft 37 extending into the receiving chamber 51 of the measuring system 14.

The first mechanical pickup element 68, as shown in FIG. 2*a*, has the form of a gear wheel with teeth 73 extending in parallel to the central longitudinal axis 18. The teeth 73, when passing the electronic sensor elements 74, 75, mounted fixedly to the housing, trigger pulse-shaped alternating voltage output signals of these sensor elements 74, 75, i.e. sequences of voltage pulses varying between a maximum level and a minimum level, the pulse shape of which, at a given number of revolutions of the hollow shaft and/or rotor 43 of the electric motor 41, corresponds in close approximation to a sine wave.

So-called field plate sensors of a conventional construction are utilized as the sensor elements 74, 75, wherein the amplitudes of the output signals are independent of the rotational velocity of the mechanical pickup elements, i.e. the signal level of their output signals varies between definite upper and lower extreme values so that the output signals of the two sensor elements 74, 75 can be satisfactorily evaluated also with respect to the level.

The two sensor elements 74, 75 are arranged at such an azimuthal spacing from Δϕ from each other that a phase shaft of 90° exists between their output signals. Consequently, from a continuous monitoring of the chronological course of the output signals form the two sensor elements 74, 75 and the chronological changes (differential quotients with respect to time) of these elements, it is also possible to detect the sensor of rotation of the hollow shaft 37.

This evaluation of the sensor output signals takes place in accordance with known algorithms in the electronic control unit 13 which receives the output signals of the two sensor elements 74, 75.

The gear-shaped pickup element 68 and the sensor elements 74, 75 associated therewith thus constitute an angular position measuring system, the accuracy of which is greater, the larger the number of teeth 73 distributed equidistantly over the circumference of the pickup element 68, and the higher the accuracy of the output signal amplitudes of the two sensor elements 74, 75 can be measured The measuring accuracy in this respect permits the exact detection of the angular distance of two successive teeth to 1/100 of its amount. With an angular spacing of 3.6° between respectively two successive teeth 73, the accuracy of the angular position measuring system 68, 74, 75 thus amounts to $3.6\times10^{-20}$.

The second mechanical pickup element 69, rotating with the hollow shaft 37, as shown in FIG. 2*b*, if fashioned as an element having the shape of an annular flange and, at a periphery of the pickup element 69, the pickup element has only a single, for example, V-shaped slot 76; however, alternatively, a pointed projection 76' may be provided When the slot 76 or the projection 76' passes an electronic sensor element 77 associated with the pickup element 69 fixedly mounted to the housing, in each case a reference pulse will be triggered.

As a result of the generation of the reference pulse of the electronic sensor element 77, the structure of which is analogous to that of the sensor elements 74, 75 of the angular position measuring system 68, 74, 75, a reference plane is defined to which the angular positions of the shaft, detectable by the two sensor elements 74, 75 within one revolution, can be related. Accordingly, by virtue of the angular position and speed of rotation pulses occurring at a specific direction of rotation of the hollow shaft 37, transmitted by the sensor elements 74, 75 and, optionally, 77, it is possible, in a simple manner, by a corresponding evaluation in the electronic control unit 13, to control the setting of the desired position value for the drive piston 16 of the hydraulic motor 11.

The gear-wheel-type pickup element 61 and the angular-flange-type pickup element 69, as well as the electronic sensor elements 74, 75 or 77, associated therewith, are arranged and fashioned in such a manner that the output signals at least of the two sensor elements 74, 75 of the angular position measuring system 68, 74, 75 are not affected by the axial displacements of the hollow shaft 37 possible during operation of the drive mechanism 10 and, also the pickup elements 68, 69, since the output signals of the two sensor elements 74, 75 are amendable to a maximally accurate evaluation also with regard to the amounts of their amplitudes (signal level).

Although not absolutely necessary for the reference measuring system 69, 77, it is also advantageous for the amplitudes of the output signals generated by the sensor element 77 not vary, at least not drastically, with axial shifting of the annular-flange-type pickup element 69.

In contradistinction thereto, the partial system of the measuring arrangement 14 comprising the third rotating pickup element 71 and at least one further electronic sensor element 78, fixedly mounted to the housing, is designed so that the output signal level of the output signals produced by this third electronic sensor element 78 varies significantly, preferably, in a linear relationship with the axial shifts of the pickup element 71 or of the hollow shaft 37. This feature is to make it possible to determine with adequate accuracy the lag error ΔS respectively governing in the operation of the drive mechanism 10 from the pertinent variation and/or the respective amount of the output signal of the sensor element 78.

For this purpose, in the simple construction of the lag error measuring system 71, 78 that can be derived from FIG. 1, the mechanical pickup element thereof may be fashioned as an annular rib with conical flanks 79, 81 adjoining each other along a shaft annular edge 82. By the axial shift thereof relative to the sensor element 78, the output signal level of the latter is influenced.

As the sensor element 78, in turn, an element is provided of the type described above for the angular position measuring system 68, 74, 75. With a view toward a simply evaluating possibility of the level of the output signals from the sensor element 78 in units of the lag error ΔS, it is advantageous to link, with the blocking basic position 0 of the follow-up control valve 12, a position of the mechanical pick-up element 71 wherein the output signal of the sensor element 78 of the lag error measuring system 71, 78 corresponds to a high or low extreme value As a result, changes of the output signal level of the sensor element 78 are, in each case, in monotonous connection with the lag error ΔS in one or the other direction.

An adjustability of the lag error measuring system 71, 78 required in this respect, can be realized by providing that the pickup element be threaded onto a thread 83 of the hollow shaft end section 72 and is thereby arranged to be displaceable, in a defined fashion, in the axial direction and can be fixed in place by a securing nut (not shown).

As an alternative to the structure of the pickup element 71 illustrated in FIG. 1, and symmetrical with respect to the plane of the annular edge 82, it is possible, as shown in FIG. 2*c*, to provide, as the mechanical pickup element, a single-cone ring 71' in order to obtain a monotonous correlation of the output signal level of the sensor element 78 with the lag error ΔS. In the design of the mechanical pickup element 71' of the lag error measuring system 71', 78, illustrated in FIG. 2*c*, calibration thereof in units of the lag error ΔS is possible in a simple manner by storing the output signal level of the sensor element 78 as the reference point for the lag error measurement upon activation of the drive mechanism, i.e. as long as the hollow shaft 37 or the pickup element 71' cannot, as yet, have been subjected to shifting, and, in this manner, the level is taken into account as the correction variable for the lag error measurement.

Realization of a correction and/or evaluating circuit required in this respect is readily possible for a person skilled in the art familiar with conventional electronic circuitry technology, if such person knows the purpose, so that details in this connection do not require further explanation.

In order to increase the accuracy of lag error measurement, it is also be advantageous, in combination with a device capable of recognizing the sense of the change of the lag error ΔS, to provide a mechanical pickup element 71' within the scope of the lag error measuring system, as shown in the bottom portion of FIG. 2*c*, wherein the radius of this element varies periodically between a minimum value r and a maximum value R within the axial length L of the pickup elements 71'' utilized for the lag error measurement, preferably, in a linear fashion, as illustrated. A sensor system recognizing the direction of lag error change can then be realized in a simple manner with two sensor elements 78', 78'', of the same type as the sensor element 78. These sensor elements 78', 78'' are arranged at a mutual spacing ΔL dimensioned so that their output signals, based on the periodic structure of the pickup element 71'', have a phase shift of 90° or an odd-number multiple thereof Consequently, in analogy to the angular position measuring system 68, 74, 75, it is also possible to recognize, additionally to the absolute value of the lag error ΔS, its direction of change from the axial shifts of the pickup elements 71''.

An arrangement of the two sensor elements 78', 78'' in this respect is, for example, one wherein their axial spacing ΔL has a value of ¼l, wherein l means the length of periodicity of the periodic structure of the pickup element 71''. Also, in this embodiment of the lag error measuring system 71'', 78', 78'', a calibration is possible by storing, prior to or at the beginning of the control and monitoring operation, the output signal combinations of the two sensor elements 78' and 78'' and considering them as reference variables for further measurements.

I claim:

1. A hydraulic drive for adjustment, feed, and return movements of a toolhead of a machine tool, the hydraulic drive comprising:

a hydraulic motor including a movable drive element fixedly coupled to the toolhead, said drive element being drivable by alternative pressurization and pressure relief of drive pressure chambers in accordance with tool movements;

a follow-up control valve operating in response to an electromechanically controllable reference position value setting for the movable drive element and mechanical actual position value return indication;

means for setting a reference position value and return indication of an actual position value including a threaded spindle and a spindle nut fashioned as a hollow shaft and meshing with a thread of the spindle, one of the threaded spindle and the spindle nut forming a reference value setting element, one of the threaded spindle and spindle nut being adapted to be driven by an electric motor in a direction of rotation of the electric motor in accordance with a setting of the reference position value, and the other of the threaded spindle and spindle nut being adapted to be axially displaced by a drive element in accordance with an actual position value return indication;

an electronic control unit provided with an interface for an NC or a CNC control for producing signals required for motion control of the electric motor;

a rotational and angular position pickup system for producing output signals containing information relating to a total number of revolutions by the reference value setting element as well as the azimuthal position of the reference value setting element within each revolution; and an electronic displacement pickup system providing output signals which constitutes a direct measure for axial deflections of the reference value setting element and a valve operating member of the follow-up control valve also executing these axial deflections from a rest position and providing a measure for the lag error by which at lest one of the toolhead or the drive element of the hydraulic motor trails with respect to a reference position.

2. A hydraulic drive according to claim 1, wherein the value setting element includes the hollow shaft, and wherein the actual position value return indication element is the threaded spindle.

3. A hydraulic drive according to claim 1, wherein the electronic control unit causes activation of the electric motor so as to set the reference position value and is adapted to receive input signals which represent output signals of the rotational and angular position pickup system and output signals of the displacement pickup system, said electronic control unit producing, following a processing therein, at least one of partial lag error compensation, a maintaining of the lag error constant, or a cutting off of the hydraulic drive when the lag error exceeds an adjustably preset threshold valve.

4. A drive according to one of claims 1-3, wherein the rotational and angular position measuring system includes a rotating pickup element having a contour which, as viewed in a peripheral direction, has one of a periodically wavy or periodically toothed shape, voltage output signals characteristic for the angular position of the reference value setting element are produced by a passage of the rotating pickup element past at least one sensor element, said pickup element being arranged in coaxial disposition with respect to a central axis of the reference value setting element and the actual value return indication element, said sensor element being arranged fixedly at a portion of a machine accommodating the machine tool, and wherein a further pickup element is nonrotatably connected with the reference value setting element, a circumference of the further pickup element including one of a radial projection or radial recess, with a passage of the projectional recess past a further electronic sensor element, fixedly arranged at the machine, enabling a triggering of reference signals for a number of completely executed revolutions by the reference value setting member.

5. A hydraulic drive according to one of claims 1-3, wherein the electronic displacement pickup system includes a pickup element nonrotatably and nondisplaceably connected with the reference value setting element, axial deflections of said last mentioned pickup element with respect to at least one noncontactually responding electronic sensor element, arranged fixedly at the machine, changing an output signal of said noncontactually responding sensor element to an extent representing the nature of the deflection, and wherein a rotor of the electric motor is nonrotatably and nondisplaceably connected with the reference value setting element and is arranged so as to be axially shiftable together therewith relative to the stator of the motor fixedly mounted to a housing.

6. A hydraulic drive according to claim 1, wherein the hollow shaft forms the reference position value setting element and the threaded spindle forms the actual position value element, said threaded spindle being nondisplaceably connected to a drive element of the hydraulic motor, and wherein the threaded spindle is surrounded by the hollow shaft along a section of a length thereof corresponding at least to a displacement path of the drive element of the hydraulic motor.

7. A hydraulic drive according to one of claim 1-3, wherein the electric motor is arranged in a leakage oil chamber of the hydraulic drive.

8. A hydraulic drive according to claim 7, wherein at least one of the rotational and angular position pickup system and the electronic displacement pickup system is arranged in the leakage oil chamber of the hydraulic drive.

9. A hydraulic drive according to one of claims 1-3, wherein the rotational and angular position pickup system includes a mechanical pickup element, a toothed rim with one hundred teeth distributed equidistantly over a circumference on the rim and extending in an axial direction, and wherein two electronic sensor elements are provided, and azimuthal distance of which is an odd-number multiple of one-fourth of an angular distance of neighboring teeth of the toothed rim, and the two electronic sensor elements are fashioned as field plate sensors.

10. A hydraulic drive according to claim 9, wherein the mechanical pickup element has at least one ramp surface extending obliquely to a central longitudinal axis, a variation of a distance of the ramp surface from the respective electronic sensor elements coupled with an axial shift of the pickup elements, yield a shift proportional change of the output signal of the respective sensor element.

11. A hydraulic drive according to claim 10, wherein the mechanical pickup element, as viewed over a length thereof, has a periodically varying diameter, and the two electronic sensor elements are located at an axial distance from each other which is an odd-number multiple of l/4, wherein l represents a length of periodicity of the diameter variation of the pickup element.

12. A hydraulic drive according to one of claims 1-3, wherein the electronic control unit comprises a correction or evaluating circuit by which output signals of the rotational and angular position pickup system produced in a basic position of one of the follow-up control valve or the lag error measuring system are taken into account as reference values for the rotational and angular position measurement and for a lag error measurement, respectively.

* * * * *